(12) United States Patent
Pedersen et al.

(10) Patent No.: US 10,099,858 B2
(45) Date of Patent: Oct. 16, 2018

(54) TRAY FEEDING SYSTEM AND A METHOD OF OPERATING SUCH A TRAY FEEDING SYSTEM

(71) Applicant: Marel A/S, Aarhus N (DK)

(72) Inventors: Bjørn Heide Pedersen, Randers (DK); Niels Hundtofte, Egå (DK); Carl-Jørn Madsen, Åbyhøj (DK); Lars Riis Jensen, Hørning (DK)

(73) Assignee: MAREL A/S, Aarhus N (DK)

( * ) Notice: Subject to any disclaimer, the term of this patent is extended or adjusted under 35 U.S.C. 154(b) by 0 days.

(21) Appl. No.: 15/320,618

(22) PCT Filed: Jul. 3, 2015

(86) PCT No.: PCT/DK2015/050204
§ 371 (c)(1),
(2) Date: Dec. 20, 2016

(87) PCT Pub. No.: WO2016/000725
PCT Pub. Date: Jan. 7, 2016

(65) Prior Publication Data
US 2017/0144843 A1    May 25, 2017

(30) Foreign Application Priority Data
Jul. 3, 2014 (EP) .................................. 14175630

(51) Int. Cl.
*B65G 17/24* (2006.01)
*B65G 47/31* (2006.01)
(Continued)

(52) U.S. Cl.
CPC ............. *B65G 17/24* (2013.01); *B65G 15/00* (2013.01); *B65G 17/30* (2013.01); *B65G 37/00* (2013.01);
(Continued)

(58) Field of Classification Search
CPC ......... B65G 47/31; B65G 17/24; B65G 39/20
See application file for complete search history.

(56) References Cited

U.S. PATENT DOCUMENTS 3,075,630 A * 1/1963 Fisk ....................... B65G 43/08
                                                        198/460.1
3,485,339 A * 12/1969 Miller ................... B65G 43/08
                                                        198/460.1
(Continued)

FOREIGN PATENT DOCUMENTS

DE          3237195 A1    4/1984
JP          S6047714 U    4/1985
(Continued)

OTHER PUBLICATIONS

PCT International Search Report; International Application No. PCT/DK2015/050204; Date of Actual Completion of International Search: Sep. 21, 2015; Date of Mailing of International Search Report: dated Jan. 10, 2015.

*Primary Examiner* — Thomas Randazzo
(74) *Attorney, Agent, or Firm* — Workman Nydegger

(57) ABSTRACT

A tray feeding system having a buffer conveyor for trays including a belt with spaced apart free running rollers having a rotation axis perpendicular to the conveying direction. These rollers extend upward from the belt such that the trays partly rest on the rollers. A tray conveyor receiving end is adjacent to an outputting end of the buffer conveyor where items are placed into the trays by a tray filler. A roller interactor is positioned below and adjacent to the surface of the buffer conveyor belt at an outputting end to engage with the rollers at the outputting end area when the buffer conveyor belts move forward rotating the rollers positioned within the outputting end area accelerating the trays on the (Continued)

buffer conveyor within the outputting end area of the buffer conveyor towards the receiving end of the tray conveyor.

17 Claims, 2 Drawing Sheets

(51) Int. Cl.
    *B65G 39/20*     (2006.01)
    *B65G 15/00*     (2006.01)
    *B65G 17/30*     (2006.01)
    *B65G 47/30*     (2006.01)
    *B65G 37/00*     (2006.01)
    *B65G 43/08*     (2006.01)
    *B65G 47/26*     (2006.01)

(52) U.S. Cl.
    CPC ............. *B65G 39/20* (2013.01); *B65G 43/08* (2013.01); *B65G 47/261* (2013.01); *B65G 47/30* (2013.01); *B65G 47/31* (2013.01)

(56) References Cited

U.S. PATENT DOCUMENTS

| | | | | |
|---|---|---|---|---|
| 4,852,717 A * | 8/1989 | Ross | ...................... | B65G 43/08 198/462.3 |
| 5,082,103 A * | 1/1992 | Ross | ...................... | B65G 47/31 198/460.1 |
| 5,475,965 A * | 12/1995 | Mondini | ................. | B29C 65/02 198/468.1 |
| 6,244,421 B1 * | 6/2001 | Hall | ....................... | B65G 43/08 198/460.1 |
| 7,017,321 B2 * | 3/2006 | Salvoni | ................... | B65B 7/164 198/460.1 |
| 7,311,192 B2 * | 12/2007 | Fourney | ................. | B65G 17/24 198/345.3 |
| 7,344,018 B2 * | 3/2008 | Costanzo | ............... | B65G 17/24 198/370.09 |
| 7,770,718 B2 * | 8/2010 | Fourney | ................. | B65G 17/24 198/463.3 |
| 7,997,046 B2 * | 8/2011 | Salvoni | ................. | B65G 47/31 198/464.3 |
| 9,327,855 B2 * | 5/2016 | Hurni | ...................... | B65B 57/16 |
| 2006/0090424 A1 * | 5/2006 | Tokarz | .................... | B65B 5/105 53/448 |
| 2008/0082206 A1 * | 4/2008 | Egami | .................... | B65G 43/10 700/230 |
| 2008/0121498 A1 * | 5/2008 | Costanzo | ............... | B65G 17/24 198/779 |
| 2014/0156061 A1 * | 6/2014 | Neiser | .................... | B65G 43/10 700/223 |
| 2017/0043959 A1 * | 2/2017 | DePaso | .................. | B65G 17/24 |

FOREIGN PATENT DOCUMENTS

| | | |
|---|---|---|
| WO | 9900306 A2 | 1/1999 |
| WO | 2007124958 A1 | 11/2007 |

* cited by examiner

TRAY FEEDING SYSTEM AND A METHOD OF OPERATING SUCH A TRAY FEEDING SYSTEM

CROSS REFERENCES TO RELATED APPLICATIONS

This application is the U.S. National Phase of International Application No. PCT/DK2015/050204 filed on Jul. 3, 2015, which claims the benefit of priority to European Patent Application No. 14175630.4 filed on Jul. 3, 2014, the entire disclosures of which are incorporated herein by reference.

FIELD OF THE INVENTION

The present invention relates to a tray feeding system and to a method of operating such a tray feeding system.

BACKGROUND OF THE INVENTION

FIG. 1 depicts graphically an example of a common type of a tray feeding system for feeding trays from a tray denester device 101 to a buffer conveyor 102, and from the buffer conveyor to a tray conveyor 103 where items are placed into the trays by a tray filling means, in this case robots 104, 105. In such systems it is of outmost importance that the trays on the tray conveyor 103 are arranged closely together to maximize the throughput of the system, and more importantly it is crucial that the transfer of the trays from the denester device 101 to the tray conveyor 103 via the buffer conveyor occurs fast and without any disturbance, e.g. trays falling off the buffer conveyor 102.

However, due to how light the trays are, e.g. ranging from few grams to tens of grams, only a minor failure can cause a major interruption in the tray feeding, e.g. such as shown here where two trays collide causing an interruption and in most cases requires a manual intervening in fixing this failure. This does not only mean extra costs due to labor but also is reflected in a less throughput due to the lost time.

There is thus a need for a more reliable and stable tray feeding system that not only reduces or even eliminates the manual labor but also has a higher throughput.

SUMMARY OF THE INVENTION

On the above background it is an object of embodiments of the present invention to provide a reliable tray feeding system that greatly reduces or even eliminates the above mentioned failures in delivering empty trays from a tray denester device to a tray conveyor via a tray buffer conveyor and thus enhances the throughput of the tray feeding system.

In general, the invention preferably seeks to mitigate, alleviate or eliminate one or more of the above mentioned disadvantages of the prior art singly or in any combination. In particular, it may be seen as an object of embodiments of the present invention to provide a tray feeding system that solves the above mentioned problems, or other problems.

To better address one or more of these concerns, in a first aspect of the invention a tray feeding system is provided, comprising:

a first conveyor adapted to be used as a buffer conveyor for trays, the first conveyor comprising a first conveyor belt including a plurality of spaced apart rollers acting as free running rollers having rotation axis being substantially perpendicular to the conveying direction of the first conveyor, the plurality of spaced apart rollers further being arranged such that the rollers partly extend upward from the carrying surface of the first conveyor belt such that the trays resting on the first conveyor at least partly rest on the rollers, and a second conveyor having a receiving end placed adjacent to an outputting end of the first conveyor adapted to be used as a tray conveyor where items are placed into the trays by a tray filling means, wherein the tray feeding system further comprises a roller interacting means positioned below and adjacent to the carrying surface of the first conveyor belt at an outputting end area of the first conveyor, the roller interacting means being adapted to engage with the rollers upon arriving at the outputting end area when the first conveyor belt is moving forward causing a rotational movement of the rollers positioned within the outputting end area and thus an acceleration of the tray or trays resting on the first conveyor within the outputting end area of the first conveyor towards the receiving end of the second conveyor.

Accordingly, due to the interaction between the rollers and the roller interacting means, which in one embodiment may be a flat plate structure, the rollers that are within the outputting end area of the first conveyor act as a kind of a driving wheels onto the trays that are positioned within this area, while the remaining part of the rollers at the upstream side of the first conveyor act as idle rollers. Therefore, by speeding up the first conveyor belt the rollers within the outputting end area of the first conveyor will also speed up and thus exert with a force on the trays within this outputting end area, i.e. a driving zone within the first conveyor belt is defined.

Also, assuming a kind of a stopper is provided at the receiving end of the second conveyor (as will be discussed in more details later), because of the negligible force the "idle" rollers exert with on the trays and thus on the trays positioned within the outputting end area of the first conveyor it is possible to form a queue on the first conveyor and simultaneously preventing a disorder in the queue, e.g. falling off the first conveyor.

The length of the roller interacting means may in one embodiment correspond to the length of one tray or more trays, e.g. two or three trays.

The items are preferably any type of food items, e.g. chicken fillets, fish fillets, slices of beef and the like.

The first conveyor belt may be considered as a low friction conveyor belt where the plurality of roller acts as idle rollers. By utilizing such rollers for carrying trays the friction between the trays and the conveyor belt is greatly reduced since these rollers can rotate to stay backwards while the conveyor belt is moving forward with the result that the upper surface of the conveyor belt, with the trays on it, is not moving.

The phrase plurality of spaced apart rollers acting as free running rollers may accord the present invention be understood as rollers that act as idle rollers that do exert with negligible force on the trays resting on the rollers.

It should further be understood that two or more rollers selected from said plurality of spaced apart rollers may be attached to the same axis such that said two or more rollers act in a way as a single free running roller unit (idle roller unit).

The term rollers may according to the present invention be understood as any type of arc shaped bodies, e.g. cylindrical shaped bodies, or spherical shaped bodies, or disc shaped bodies, and the like. Or put in other words, the term rollers is preferably meant a body when cut through its arc shaped body has a cylindrical cross sectional shape.

In one embodiment, the second conveyor is configured for conveying said trays with the trays being fixed by friction on the second conveyor and wherein the tray feeding system is configured such that at least one of the tray or trays resting on the first conveyor within the outputting end area is moved onto the receiving end of the second conveyor to a position abutting a tray already placed on the second conveyor.

Accordingly, since the second conveyor is configured for conveying said trays with the trays being fixed by friction on the second conveyor, e.g. with the belt of the second conveyor having a friction withholding the trays, including the empty trays, on the second conveyor in the positions where they have been placed, it is facilitated that items can be placed into the trays by the tray filling means, since e.g. the positions of the trays on the second conveyor can be known and since the trays will not move in relation to the second conveyor during e.g. acceleration, deceleration, etc. of the second conveyor under e.g. normal operating conditions.

Also, due to the second conveyor being configured for withholding trays by friction, a tray that has been resting on the first conveyor within the outputting end area and which is moved onto the receiving end of the second conveyor can be delivered here to a position abutting a tray already placed on the second conveyor.

In one embodiment, the second conveyor comprises a second conveyor belt having a coefficient of friction being equal or higher than the coefficient of friction of the tray material. It is thus avoided that the trays on the second conveyor e.g. slide or fall off the conveyor, i.e. a more stability between the trays and the conveyor belt is provided.

Also, the material is selected such that the friction force between the conveyor belt and the trays is large enough to allow the tray(s) at the receiving end of the second conveyor to act as "stopper" for the trays on the outputting end area of the first conveyor. This may be the case where the trays on the second conveyor are being filled with items, e.g. food items such as chicken fillet, and have not yet fulfilled a pre-defined target, e.g. a target weight and/or number of items within the trays. When trays at the outputting end of the second conveyor have fulfilled the pre-defined target, e.g. a tray at the outputting end has fulfilled the target the second conveyor belt is advanced corresponding to a fixed length or corresponding to a length of this tray. This fixed length distance may e.g. correspond to a half tray length, a complete tray length, 1.5 times the tray length etc. Accordingly, the system is not limited to a specific multiply of tray lengths as in prior art tray feeding systems meaning that the flexibility of the tray feeding system according to the present invention is enhanced.

Also, this allows the system to receive different types of trays having e.g. different lengths which makes the system more flexible.

The operation of the first conveyor belt when the second conveyor belt is advanced is preferably such that the receiving end of the second conveyor will immediately be filled with trays from the first conveyor. This will be discussed in more details later.

Also, during operation where e.g. the second conveyor is operated in discrete steps, e.g. by starting and stopping the second conveyor, it is ensured that the trays on the second conveyor will not move, i.e. slide on the second conveyor belt.

It should be noted that such "stoppers" may also be provided via plurality of flights extending upward from the second conveyor or conveyor belt that may e.g. be arranged in a pre-defined order, e.g. with a fixed distance that may be adapted to the size of the trays.

In one embodiment, the coefficient of friction of the plurality of spaced apart rollers is equal to or larger than the coefficient of friction of the tray material. It is thus ensured that a sufficient grip between the rollers and the trays is provided to provide the above mentioned acceleration of the trays from the first conveyor to the second conveyor.

The spaced apart rollers may also be provided with a rough surface, e.g. have a tooth or rough like surface that interacts with the bottom trays, but the trays may also have a rough surface so as to facilitate the contact between the rollers and the bottom of the trays.

In one embodiment, the system further comprises a sensor arranged at a pre-fixed distance from the receiving end of the second conveyor adapted to detect a position of an incoming tray at the second conveyor. This pre-fixed distance may in one embodiment correspond to at least a length of a single tray. It should be noted that the trays that are arranged between the receiving end of the second conveyor and the sensor are trays that are empty, but the filling of the items into the trays does typically not start until this position has been detected. Subsequent to this detected position of the trays on the second conveyor they may be tracked such that the means for putting items into the trays, e.g. one or more robotic arms, knows the position of the trays during putting the items into the trays. This pre-fixed distance is thus preferably selected such that the empty trays within this distance provide the sufficient repelling force needed onto the empty trays at the outputting end area of the first conveyor.

In one embodiment, the roller interacting means comprises a flat plate structure. The length of the plate structure may as an example be adapted to the length of the trays, e.g. correspond to a length of one or two trays, or even more, or the length of the plate structure may in some cases be shorter than the length of the trays. The material of the plate structure may be any type of e.g. plastic material and preferably have a friction of coefficient that is high enough to provide the necessary contact with the plurality of wheels such that the wheels engage with the surface layer of the plate structure.

In one embodiment, the system further comprises a tray dispenser unit associated to the first conveyor for dispensing trays onto the first conveyor belt. This would be preferred when the tray feeding to said first conveyor is done automatically. However, it should be noted that tray feeding may also include a manual tray feeding.

In one embodiment, during operation the second conveyor is loaded with trays including trays on the receiving end of the second conveyor that act as a stopper for the trays at the outputting end area of the first conveyor when the second conveyor is stopped, wherein the tray feeding system further comprises a control unit for controlling the advancing of the first and the second conveyors, wherein the controlling comprises:

speeding up the first conveyor belt, when at least one tray at an outputting end of the second conveyor has fulfilled a pre-defined target, up to a pre-defined first speed value, speeding up the second conveyor belt up to a pre-defined second speed value, synchronizing the accelerations of the first and the second conveyors such that the space created at the receiving end of the second conveyor subsequent to accelerating the second conveyor is subsequently filled up with at least one tray from the outputting end area of the first conveyor, and subsequently stopping the second conveyor and reducing the speed of the first conveyor.

A high throughput and simultaneous reliable tray feeding system is provided where the risk of that trays impact together causing them e.g. to fall off the conveyors is eliminated. Also, with the system according to the present invention it is now possible to use trays of different types, e.g. of different length, and thus a highly flexible tray feeding system is provided.

The speeding up of the second conveyor may in one embodiment be done from a stationary position, or it may be running at an initial speed that is lower than said pre-defined second speed value.

The speed of the first conveyor may in one embodiment be reduced down to a stationary position.

In one embodiment, the tray feeding system according to any of the preceding claims, wherein during operation the second conveyor is loaded with trays including trays on the receiving end of the second conveyor that act as a stopper for the trays at the outputting end area of the first conveyor when the second conveyor is stopped, wherein the tray feeding system further comprises a control unit for controlling the advancing of the first and the second conveyors, wherein the controlling comprises:

maintaining the first conveyor belt at a first speed value, speeding up the second conveyor belt up to a pre-defined second speed value, synchronizing the accelerations of the second conveyor such that the space created at the receiving end of the second conveyor subsequent to accelerating the second conveyor is subsequently filled up with at least one tray from the outputting end area of the first conveyor, and subsequently stopping the second conveyor and reducing the speed of the first conveyor.

In one embodiment, the tray filling means comprises a robotic system and where placing the items into the trays comprises placing the items into the trays until a pre-defined target value is reached. The tray filling means may e.g. be one or two or more e.g. side by side arranged robots that are placing food products such as chicken fillets into the trays until e.g. a pre-defined target is achieved, for example a pre-defined target weight.

In a second aspect of the invention a method is provided of feeding trays using a tray feeding system according to any of the preceding claims.

In one embodiment, subsequent to providing the second conveyor belt with a plurality of trays such that a tray is provided at the receiving end of the second conveyor and subsequent to providing the first conveyor with trays such that at least one tray is provided at outputting end area of the first conveyor, the method comprises:

speeding up the second conveyor belt up to a pre-defined second speed value, synchronizing the accelerations of the first and the second conveyors such that the space created at the receiving end of the second conveyor subsequent to accelerating the second conveyor is subsequently filled up with at least one tray from the outputting end area of the first conveyor, and subsequently stopping the second conveyor and reducing the speed of the first conveyor.

In one embodiment, subsequent to providing the second conveyor belt with a plurality of trays such that a tray is provided at the receiving end of the second conveyor and subsequent to providing the first conveyor with trays such that at least one tray is provided at outputting end area of the first conveyor, the method comprises:

maintaining the first conveyor belt at a first speed value, speeding up the second conveyor belt up to a pre-defined second speed value, synchronizing the accelerations of the second conveyor such that the space created at the receiving end of the second conveyor subsequent to accelerating the second conveyor is subsequently filled up with at least one tray from the outputting end area of the first conveyor, and subsequently stopping the second conveyor and reducing the speed of the first conveyor.

Accordingly, a high throughput and reliable method is provided for feeding trays from the tray dispenser device to the second conveyor belt. Also, a flexible system and method is provided where the flexibility is e.g. reflected in that the space that is created at the receiving end of the second conveyor is not necessarily a multiple of tray lengths, which is the case in prior art tray feeding systems that utilize flights in the conveyor belts. This means that the e.g. the space that is created at the receiving end of the second conveyor may e.g. be 600 mm, or 300 mm, whereas the tray length may be 350 mm as an example.

Also, trays of various sizes and/or lengths may be utilized simultaneously meaning that the system is not limited to only one type of trays, or two types of trays, which is common where conveyor belts with fixed flights are utilized to receive the trays.

In one embodiment, prior to accelerating the first conveyor belt to the second speed value the first conveyor is either stopped or is running at a constant speed being lower than the second speed value and where subsequent to filling the space created at the receiving end of the second conveyor at least one trays the speed of the first conveyor is reduced to the same initial speed value or is stopped. By running the first conveyor at a constant speed it is possible to utilize the time while the second conveyor is stopped and thus while the tray(s) at the outputting end area of the first conveyor is still, to fill the first conveyor with trays.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
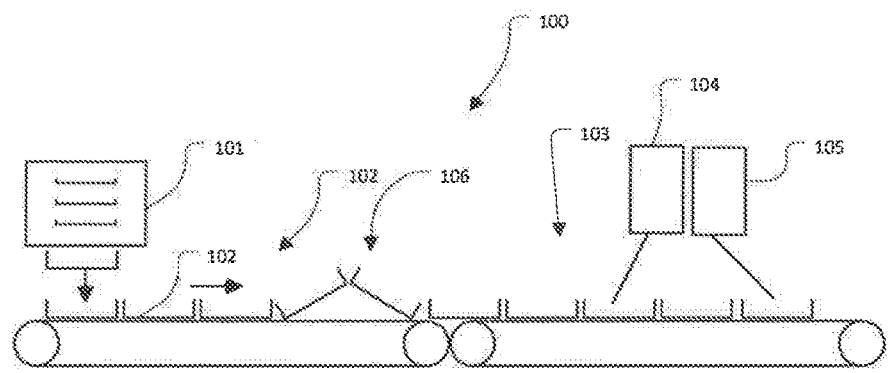
FIG. 1 depicts graphically an example of a common type of a tray feeding system for feeding trays from a tray denester device to a buffer conveyor, and from the buffer conveyor to a tray conveyor, where items are placed into the trays by a tray filling means.
Figure 2:
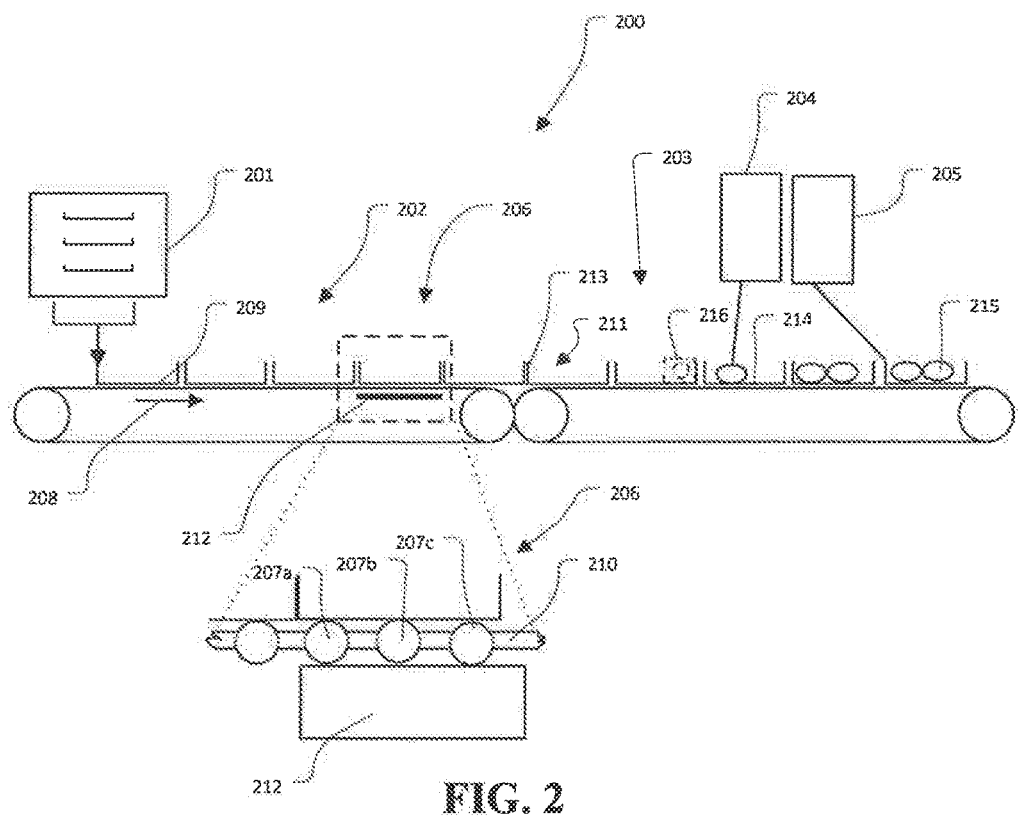
FIG. 2 depicts an embodiment of a tray feeding system according to the present invention.

FIG. 2 depicts an embodiment of a tray feeding system 200 according to the present invention, where the system comprises a first conveyor 202, a second conveyor 203, a tray dispenser unit 201 and a tray filling means 204, 205.

The first conveyor 202 is adapted to be used as a buffer conveyor for trays 209 supplied by the tray dispenser unit 201. The first conveyor 202 comprises a first conveyor belt 210 including a plurality of spaced apart rollers 207 acting as free running rollers having rotation axis being substantially perpendicular to the conveying direction of the first conveyor 202 as indicated by arrow 208. The plurality of spaced apart rollers 207 are further arranged such that the rollers partly extend upward from the carrying surface of the first conveyor belt such that the trays resting on the first conveyor at least partly rest on the rollers 207.

The second conveyor 203 has a receiving end 211 placed adjacent to an outputting end 206 of the first conveyor 202. The second conveyor 203 is adapted to be used as a tray conveyor where items 215 are placed into the trays by a tray filling means. The items may be positioned on a separate conveyor (not shown) that may be placed adjacent or parallel to the second conveyor 203 and be running in the same conveyor direction as second conveyor 203.

The feeding system 200 may in one embodiment further comprise a sensor 216, e.g. light sensor and the like, for sensing the position of the trays 214 on the second conveyor so as to determine the exact position of the trays on the second conveyor 203. Subsequent to this one time position determination on the second conveyor 203 the trays are tracked on the second conveyor, i.e. each time the second conveyor is started the position of the trays is known. Such a tracking is well known to a person skilled in the art and may e.g. be based on monitoring the distance that the second conveyor belt moves. The exact position of the trays(s) from the receiving end 211 up to this sensor 216 at the receiving end 211 of the second conveyor is typically not known, e.g. tray 213. However, as will be discussed in more details later, it is preferably ensured that the tray conveyor 203 is fully loaded with trays at all times.

The tray filling means may e.g. comprise a robotic system, such as two robotic systems 204, 205 as shown here, but the number of robotic systems may just as well include a single robotic system or more than two robotic systems.

The tray feeding system 200 further comprises a roller interacting means 212 positioned below and adjacent to the carrying surface of the first conveyor belt at the outputting end area 206 of the first conveyor 202. The roller interacting means 212 is adapted to engage with the rollers 207a-C, as depicted in more details in the expanded view of the outputting end area. Thus, when the first conveyor belt is running, e.g. from a starting position to some pre-defined speed, the rollers that at that time are in contact with roller interacting means 212 act as a driving rollers or driving wheels for the trays that are resting on these rollers.

Figure 3A:
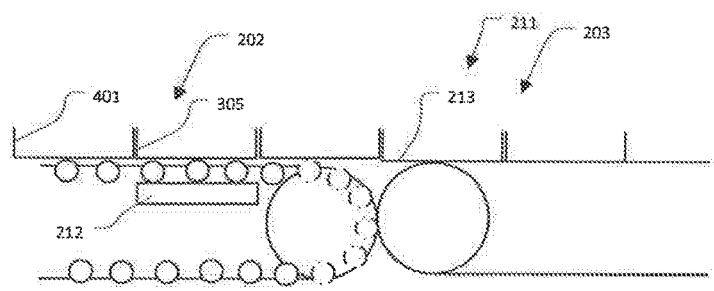
FIGS. 3A, 3B and 3C depict three different operational scenarios for the tray feeding system shown in FIG. 2, FIGS. 4A and 4B depict graphically examples of cycles repeated for each tray feed as discussed in relation to FIGS. 2 through 4B.
Figure 3B:
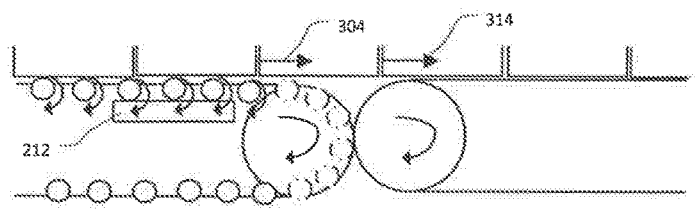
Figure 3C:
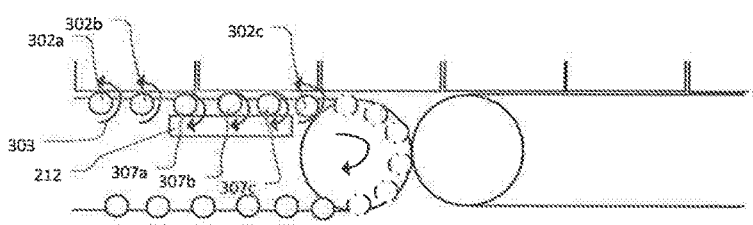

FIGS. 3A, 3B and 3C depict three different operational scenarios for the tray feeding system 200 shown in FIG. 2.

In FIG. 3A the first conveyor 202 and the second conveyor 203 are stopped, where the tray 213 at the receiving end 211 of the second conveyor 203 (see FIG. 2) acts as a stopper for the trays on the first conveyor 202.

In an embodiment, the second conveyor 203 comprises a second conveyor belt having a coefficient of friction being higher than the coefficient of friction of the tray material. This is to ensure that the trays on the second conveyor belt cannot slide thereon and that the trays move with the second conveyor belt when it changes speed, e.g. moves from a stationary position to a pre-set speed value, and vice versa, moves from the pre-set speed value and e.g. stops. More importantly, the tray 213 at the receiving end 211 of the second conveyor 203 can thus exert with a force 301 on the trays at the outputting end 206 of the first conveyor 202.

FIG. 3B shows a scenario where the second conveyor belt advances the trays as indicated by arrow 314, but this may be because one or more trays at the opposite end, i.e. tray at the right side in FIG. 2, have fulfilled a pre-defined target, e.g. up to a pre-defined target weight. As an example, the second conveyor belt may move corresponding to a pre-fixed length, that does not necessarily correspond to a multiple of tray length, which is common in such prior art tray feeding systems. Simultaneously, or shortly before (e.g. a fraction of a second), the first conveyor belt is accelerated up to a pre-defined first speed value as indicated by an arrow 304, whereby removing the halting provided by the tray 213 at the receiving end 211 of the second conveyor 203 the tray 305 that is resting on the rollers 207 at the outputting end area 206 is accelerated towards that second conveyor. Thus, the rollers that are in contact with the roller interacting means 212 act in a way as a driving rollers causing the trays at the outfeed end of the first conveyor 202 to accelerate to the second conveyor 203, where the tray being accelerated to the second conveyor may end at a position where it is abutting the tray that previously was at the receiving end of the 211 of the second conveyor 203.

The synchronization between the speeds of the first and the second conveyor belts is such that the empty space on the second conveyor at the receiving end 211 is simultaneously filled with an empty tray(s).

FIG. 3C depicts graphically the scenario where subsequent to filling up the space at the infeed end of the second conveyor 203 such that preferably no space is present between adjacent trays on the second conveyor, the second conveyor is stopped and the speed of the first conveyor is reduced to a constant speed. This is to ensure that the first conveyor 202 is fully loaded with trays at all times, i.e. to ensure that the space between the dispenser unit and the outputting end 206 of the first conveyor 202 is filled with trays.

As shown here, the rollers 302a-302c that are not in contact with the roller interacting means 212 rotate in the opposite direction as indicated by the arrows 303 because they are free running rollers, i.e. act as idle rollers, and thus exert with very low force onto the tray(s) that are above the roller interaction means 212. As shown there, the rollers 307a-307c that at this time point are in contact with the roller interacting means 212 are rotating in the clockwise direction, driven by the roller interaction means 212. These rollers 307a-307c will exert with a force on the tray or trays above the roller interaction means 212.

Figure 4A:
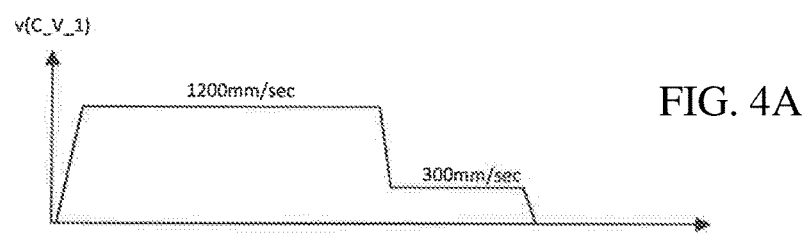
Figure 4B:
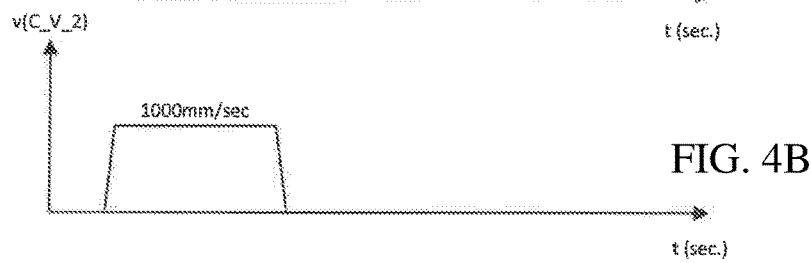

FIGS. 4A and 4B depict graphically examples of cycles repeated for each tray feed as discussed in relation to FIGS. 2 through 3C. The vertical axis indicate the speed for the first conveyor (FIG. 4A) and the second conveyor (FIG. 4B), and the horizontal axis stand for time in seconds. The speed values that are shown are only examples of possible speed values and should not be construed as being limited to these speed values.

In this example, shortly before the second conveyor speeds up to a pre-defined speed value, in this example 1000 mm/second, the first conveyor is speed up to a pre-defined value, in this example 1200 mm/second. Thus, the trays at the outputting end 206 of the first conveyor 202 will immediately fill up the space on the second conveyor 203, when the second conveyor is accelerated up to the value of 1000 mm/second. This speed of 1000 mm/second is kept constant until trays that have reached pre-defined targets have been emptied from the second conveyor. This may e.g. be a fraction of a second, or e.g. be more than one second.

As shown here, and as discussed previously in relation to FIGS. 3A, 3B, 3C, 4A and 4B, the first conveyor may temporarily be running at a constant speed value, e.g. 300 mm/seconds while that space between the tray dispenser unit 201 and the outputting end of the first conveyor 202 is filled with trays.

Figure 5:
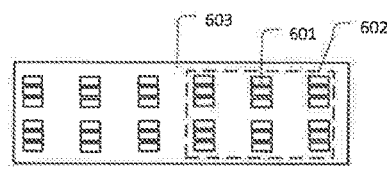
FIG. 5 shows an example of a low friction conveyor belt to be used for the first conveyor comprising a plurality of idle rollers.

FIG. 5 shows an example of a low friction conveyor belt 603 to be used for the first conveyor comprising plurality of idle roller, in this example two sets of three rollers are provided across the conveyor belt, but these rollers are rotatable around a rotation axis (not shown) that is perpendicular to the conveying direction of the conveyor belt. By utilizing such rollers for carrying trays 602 the friction between the trays 602 and the conveyor belt is greatly reduced since these rollers can rotate to stay backwards while the conveyor belt is moving forwards with the result that the upper surface of the conveyor belt, with the trays on it, is not moving.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A tray feeding system comprising:
   a first conveyor adapted to be used as a buffer conveyor for trays, the first conveyor comprising a first conveyor belt including a plurality of spaced apart rollers acting as free running rollers having rotation axis being perpendicular to a conveying direction of the first conveyor, the plurality of spaced apart rollers arranged to partly extend upward from a carrying surface of the first conveyor belt such that the trays resting on the first conveyor at least partly rest on the rollers;
   a second conveyor having a receiving end placed adjacent to an outputting end of the first conveyor adapted to be used as a tray conveyor wherein items are placed into the trays by a tray filling means;
   a roller interacting means positioned below and adjacent to the carrying surface of the first conveyor belt only at an outputting end area of the first conveyor;
   wherein the roller interacting means engage with the rollers upon arriving at the outputting end area when the first conveyor belt is moving forward causing a rotational movement of the rollers positioned within the outputting end area;
   wherein the rotational movement of the rollers causes an acceleration of the tray or trays resting on the first conveyor within the outputting end area of the first conveyor towards the receiving end of the second conveyor;
   wherein said second conveyor conveys said trays with the trays being fixed by friction on the second conveyor and wherein at least one of the tray or trays rests on the first conveyor within the outputting end area is moved onto the receiving end of the second conveyor to a position abutting a tray already placed on the second conveyor.

2. The tray feeding system according to claim 1, wherein the second conveyor comprises a second conveyor belt having a coefficient of friction being equal or higher than a coefficient of friction of the tray material.

3. The tray feeding system according to claim 1, wherein a coefficient of friction of the plurality of spaced apart rollers is equal or larger than a coefficient of friction of the tray material.

4. The tray feeding system according to claim 1, wherein the roller interacting means comprises a flat plate structure.

5. The tray feeding system according to claim 1, further comprising a tray dispenser unit associated to the first conveyor for dispensing the trays onto the first conveyor belt.

6. The tray feeding system according claim 1, wherein during operation the second conveyor is loaded with trays including trays on the receiving end of the second conveyor that act as a stopper for the trays at the outputting end area of the first conveyor when the second conveyor is stopped, wherein the tray feeding system further comprises a control unit for controlling the advancing of the first and the second conveyors, wherein the controlling comprising the steps of:
   speeding up the first conveyor belt, when at least one tray at an outputting end of the second conveyor has fulfilled a pre-defined target, up to a pre-defined first speed value;
   speeding up the second conveyor belt up to a pre-defined second speed value;
   synchronizing the accelerations of the first and the second conveyors such that the space created at the receiving end of the second conveyor subsequent to accelerating the second conveyor is subsequently filled up with at least one tray from the outputting end area of the first conveyor; and subsequently
   stopping the second conveyor and reducing the speed of the first conveyor.

7. The tray feeding system according to claim 1, wherein during operation the second conveyor is loaded with trays including trays on the receiving end of the second conveyor that act as a stopper for the trays at the outputting end area of the first conveyor when the second conveyor is stopped, wherein the tray feeding system further comprises a control unit for controlling the advancing of the first and the second conveyors, wherein the controlling comprising the steps of:
   maintaining the first conveyor belt at a first speed value;
   speeding up the second conveyor belt up to a pre-defined second speed value;
   timing the accelerations of the second conveyor such that the space created at the receiving end of the second conveyor subsequent to accelerating the second conveyor is subsequently filled up with at least one tray from the outputting end area of the first conveyor; and subsequently
   stopping the second conveyor and reducing the speed of the first conveyor.

8. The tray feeding system according to claim 1, wherein the tray filling means comprises a robotic system and wherein placing the items into the trays comprises placing the items into the trays until a pre-defined target value is reached.

9. The tray feeding system according to claim 1, further comprising a sensor arranged at a pre-fixed distance from the receiving end of the second conveyor and detecting a position of an incoming tray at the second conveyor.

10. The tray feeding system according to claim 9, wherein the pre-fixed distance corresponds to at least a length of a single tray.

11. The tray feeding system according to claim 1, wherein the first conveyor comprises an idle area without the roller interacting means, the idle area opposite the outputting end area in a direction opposite the conveying direction of the first conveyor.

12. The tray feeding system according to claim 11, wherein upon at least one of the trays resting on the idle area abutting another tray resting on the idle area, the rollers of the idle area rotate in the second direction opposite the conveying direction of the first conveyor.

13. The tray feeding system according to claim 11, wherein the roller interacting means has a length that is less than a length of the idle area.

14. A method of feeding trays using a tray feeding system according to claim 1.

15. The method according to claim 14, wherein subsequent to providing the second conveyor belt with a plurality of trays such that a tray is provided at the receiving end of the second conveyor, and subsequent to providing the first conveyor with trays such that at least one tray is provided at the outputting end area of the first conveyor, the method comprises:
- maintaining the first conveyor belt at a first speed value;
- speeding up the second conveyor belt up to a pre-defined second speed value;
- timing the accelerations of the second conveyor such that the space created at the receiving end of the second conveyor subsequent to accelerating the second conveyor is subsequently filled up with at least one tray from the outputting end area of the first conveyor; and subsequently
- stopping the second conveyor and reducing the speed of the first conveyor.

16. The method according to claim 14, wherein subsequent to providing the second conveyor belt with a plurality of trays such that a tray is provided at the receiving end of the second conveyor, and subsequent to providing the first conveyor with trays such that at least one tray is provided at the outputting end area of the first conveyor, the method comprising the steps of:
- speeding up the second conveyor belt up to a pre-defined second speed value;
- synchronizing the accelerations of the first and the second conveyors such that the space created at the receiving end of the second conveyor subsequent to accelerating the second conveyor is subsequently filled up with at least one tray from the outputting end area of the first conveyor; and subsequently
- stopping the second conveyor and reducing the speed of the first conveyor.

17. The method according to claim 16, wherein prior to accelerating the first conveyor belt to the second speed value the first conveyor is either stopped or is running at a constant speed being lower than the second speed value and wherein subsequent to filling the space created at the receiving end of the second conveyor with at least one tray the speed of the first conveyor is reduced to the same initial speed value or is stopped.

\* \* \* \* \*